US011676060B2

(12) United States Patent
Roychowdhury et al.

(10) Patent No.: US 11,676,060 B2
(45) Date of Patent: Jun. 13, 2023

(54) DIGITAL CONTENT INTERACTION PREDICTION AND TRAINING THAT ADDRESSES IMBALANCED CLASSES

(71) Applicant: Adobe Inc., San Jose, CA (US)

(72) Inventors: Anirban Roychowdhury, Columbus, OH (US); Hung H. Bui, Sunnyvale, CA (US); Trung H. Bui, San Jose, CA (US); Hailin Jin, San Jose, CA (US)

(73) Assignee: Adobe Inc., San Jose, CA (US)

( * ) Notice: Subject to any disclaimer, the term of this patent is extended or adjusted under 35 U.S.C. 154(b) by 1393 days.

(21) Appl. No.: 15/002,206

(22) Filed: Jan. 20, 2016

(65) Prior Publication Data
US 2017/0206457 A1 Jul. 20, 2017

(51) Int. Cl.
*G06N 20/00* (2019.01)
*G06Q 30/02* (2023.01)

(52) U.S. Cl.
CPC ............. *G06N 20/00* (2019.01); *G06Q 30/02* (2013.01)

(58) Field of Classification Search
CPC ...... G06N 99/005; G06N 20/00; G06N 7/005; G06N 3/08; G06Q 30/02
USPC ......................................................... 706/12
See application file for complete search history.

(56) References Cited

U.S. PATENT DOCUMENTS

| | | | | |
|---|---|---|---|---|
| 7,533,038 B2* | 5/2009 | Blume | ................... | G06Q 30/02 705/7.31 |
| 8,738,436 B2* | 5/2014 | Tuladhar | .............. | G06Q 20/102 705/14.4 |
| 9,129,228 B1* | 9/2015 | Szegedy | ................ | G06N 20/00 |
| 9,224,101 B1* | 12/2015 | Chandalia | ............ | G06K 9/6256 |
| 2006/0212350 A1* | 9/2006 | Ellis | .................... | G06Q 30/0242 705/14.41 |
| 2012/0166267 A1* | 6/2012 | Beatty | ................ | G06Q 30/0247 705/14.21 |

(Continued)

FOREIGN PATENT DOCUMENTS

WO    WO-2017093953 A1 *  6/2017    .......... G06Q 30/0202

OTHER PUBLICATIONS

Mu Li et al., "Efficient Mini-batch Training for Stochastic Optimization" Aug. 24-27, 2014, Proceedings of the 20th ACM SIGKDD international conference on Knowledge discovery and data mining, pp. 661-670 ISBN 978-1-4503-2956-9 (Year: 2014).*

(Continued)

*Primary Examiner* — Miranda M Huang
*Assistant Examiner* — Chase P. Hinckley
(74) *Attorney, Agent, or Firm* — FIG. 1 Patents

(57) ABSTRACT

Digital content interaction prediction and training techniques that address imbalanced classes are described. In one or more implementations, a digital medium environment is described to predict user interaction with digital content that addresses an imbalance of numbers included in first and second classes in training data used to train a model using machine learning. The training data is received that describes the first class and the second class. A model is trained using machine learning. The training includes sampling the training data to include at least one subset of the training data from the first class and at least one subset of the training data from the second class. Iterative selections are made of a batch from the sampled training data. The iteratively selected batches are iteratively processed by a classifier implemented using machine learning to train the model.

20 Claims, 6 Drawing Sheets

(56) References Cited

U.S. PATENT DOCUMENTS

| | | | |
|---|---|---|---|
| 2012/0323674 A1* | 12/2012 | Simmons | G06Q 30/02 705/14.41 |
| 2013/0097103 A1* | 4/2013 | Chari | G06N 20/00 706/12 |
| 2013/0204700 A1* | 8/2013 | Synett | G06N 5/02 705/14.53 |
| 2014/0222506 A1* | 8/2014 | Frazer | G06Q 30/02 705/7.29 |
| 2014/0236708 A1* | 8/2014 | Wolff | G06Q 30/0207 705/14.41 |
| 2014/0379428 A1* | 12/2014 | Phansalkar | H04L 67/22 705/7.32 |
| 2015/0088639 A1* | 3/2015 | Shay | G06Q 30/0254 705/14.46 |
| 2015/0088788 A1* | 3/2015 | Traupman | G06N 5/048 706/11 |
| 2015/0269609 A1* | 9/2015 | Mehanian | G06Q 30/0246 705/14.45 |
| 2015/0278709 A1* | 10/2015 | Zeng | G06N 20/00 706/12 |
| 2015/0332374 A1* | 11/2015 | Fano | G06Q 30/0255 705/14.66 |
| 2017/0116519 A1* | 4/2017 | Johnson | G06N 20/00 |
| 2017/0169475 A1* | 6/2017 | Korpusik | G06Q 30/0269 |
| 2018/0365715 A1* | 12/2018 | Malhotra | G06N 5/043 |

OTHER PUBLICATIONS

Dekel, Ofer et al., "Optimal Distributed Online Prediction using Mini-Batches" Jan. 31, 2012, Journal of Machine Learning Research, pp. 165-202 Citation arXiv:1012.1367v2 (Year: 2012).*
Wasikowski, Mike et al., "Combating the Small Sample Class Imbalance Problem Using Feature Selection" Oct. 2010, IEEE Transactions on Knowledge and Data Engineering, vol. 22, No. 10, pp. 1388-1400 (Year: 2010).*
Yi et al., "Purchase Behavior Prediction in M-Commerce with an Optimized Sampling Methods" Nov. 14-17, 2015 IEEE 15th International Conference on Data Mining Workshops, pp. 1085-1092. (Year: 2015).*
Park et al., "Predicting User Purchase in E-commerce by Comprehensive Feature Engineering and Decision Boundary Focused Under-Sampling" Sep. 16-20, 2015 ReeSys '15 Challenge. (Year: 2015).*
Agarwal et al., "A comparative study of Linear learning methods in Click-Through Rate Prediction" Oct. 8-10, 2015 International Conference on Soft Computing Techniques and Implementations, pp. 97-102 (Year: 2015).*
Abdi et al., "To Combat Multi-Class Imbalanced Problems by Means of Over-Sampling Techniques" Jul. 21, 2015 IEEE Transactions on Knowledge and Data Engineering, vol. 28, No. 1, pp. 238-251. (Year: 2015).*
Chakraborty et al., "Adaptive Batch Mode Active Learning" Aug. 2015, IEEE Transactions on Neural Networks and Learning Systems, vol. 26, No. 8, pp. 1747-1760. (Year: 2015).*
Fu et al., "Active Learning with Optimal Instance Subset Selection" Apr. 2013, IEEE Transactions on Cybernetics, vol. 43, No. 2, pp. 464-475. (Year: 2013).*
Bloodgood, Michael "Active Learning with Support Vector Machines for Imbalanced Datasets and a Method for Stopping Active Learning Based on Stabilizing Predictions" Spring 2009, doctoral dissertation University of Delaware, pp. i-180. (Year: 2009).*
Hoens, Thomas Ryan "Living in an Imbalanced World" Apr. 2012, doctoral dissertation Notre Dame, pp. i-194. (Year: 2012).*
Mirza et al., "Ensemble of subset online sequential extreme learning for class imbalance and concept drift" Sep. 9, 2014, Neurocomputing, No. 149, pp. 316-329. (Year: 2014).*
Alejo et al., "An Efficient Over-sampling Approach Based on Mean Square Error Back-propagation for Dealing with the Multi-class Imbalance Problem" Aug. 17, 2014, Neural Process Letters, No. 42, pp. 603-617. (Year: 2014).*
Wang et al., "A Learning Framework for Online Class Imbalance Learning" Apr. 16, 2013, IEEE Symposium on Computational Intelligence and Machine Learning, pp. 36-45. (Year: 2013).*
Sifa et al., "Predicting Purchase Decisions in Mobile Free-to-Play Games" Sep. 23, 2015, AAAI, pp. 79-85. (Year: 2015).*
Krishnan et al., "ActiveClean: Interactive Data Cleaning While Learning Convex Loss Models" Jan. 15, 2016, pp. 1-18. (Year: 2016).*
Vieira et al., "Predicting online user behaviour using deep learning algorithms" Nov. 21, 2015, pp. 1-21. (Year: 2015).*
Giannini et al., "Purchase Likelihood Prediction for Targeted Organic Food Marketing Campaigns in China" 2014, IEEE, pp. 1759-1769. (Year: 2014).*
Sarwar et al., "Two-stage Cascaded Classifier for Purchase Prediction" Aug. 16, 2015. (Year: 2015).*
Li et al., "Handling Class Imbalance in Link Prediction using Learning to Rank Techniques" Nov. 13, 2015, pp. 1-7. (Year: 2015).*
Dekel et al., "Optimal Distributed Online Prediction Using Mini-Batches" Jan. 31, 2012, pp. 165-204. (Year: 2012).*
Thorrud et Myklatun, "Predicting E-commerce Consumer Behaviour Using Sparse Session Data" Jun. 2015, NTNU, pp. i-117. (Year: 2015).*
Hernandez et al., "An Empirical Study of Oversampling and Undersampling for Instance Selection Methods on Imbalance Datasets" 2013, pp. 262-269. (Year: 2013).*
Loyola-Gonzalez et al., "An Empirical Study of Oversampling and Undersampling Methods for LCMine an Emerging Pattern Based Classifier" 2013, pp. 264-273. (Year: 2013).*
Loshchilovet Hutter, "Online Batch Selection for Faster Training of Neural Networks" Jan. 7, 2016, pp. 1-17. (Year: 2016).*
Peng, Yuxin, "Adaptive Sampling with Optimal Cost for Class-Imbalance Learning" Feb. 21, 2015, pp. 2921-2927. (Year: 2015).*
Zhang et al., "Towards Class-Imbalance Aware Multi-Label Learning" Jul. 25, 2015, pp. 4041-4047. (Year: 2015).*
Zhang et Pennacchiotti, "Predicting Purchase Behaviors from Social Media" May 2013, pp. 1521-1531. (Year: 2013).*
Li et al., "Predicting User Behavior in Display Advertising via Dynamic Collective Matrix Factorization" Aug. 2015, pp. 875-878. (Year: 2015).*
Kooti et al., "Portrait of an Online Shopper: Understanding and Predicting Consumer Behavior" Dec. 15, 2015. (Year: 2015).*
Wang et al., "Learning Hierarchical Representation Model for Next Basket Recommendation" Aug. 2015, pp. 403-412. (Year: 2015).*
Jiang et al., "Sampled Bayesian Network Classifiers for Class Imbalance and Cost-Sensitive Learning" 2013, pp. 512-517. (Year: 2013).*
Chan et al., "Predictive Models for Determining If and When to Display Online Lead Forms" 2014, pp. 2882-2889. (Year: 2014).*
Djuric et al., "Hidden Conditional Random Fields with Distributed User Embeddings for Ad Targeting" 2014, pp. 779-784. (Year: 2014).*

* cited by examiner

DIGITAL CONTENT INTERACTION PREDICTION AND TRAINING THAT ADDRESSES IMBALANCED CLASSES

BACKGROUND

Digital content interaction prediction techniques are generally used in digital medium environments to predict user interaction with digital content. Examples of these prediction techniques include click-through prediction, in which a likelihood is determined that a user will interact with (i.e., "click") an item of digital content, such as an advertisement, link in an email, and so on. Another example includes a conversion rate technique, in which a prediction is made as to a likelihood that a user will purchase a good or service from a provider as a result of interaction with digital content. These prediction techniques may be used as a basis to control which digital content is exposed by providers of a good or service to particular users to increase a likelihood of these selections and conversions by providing digital content that is likely to be of interest to the particular users. The particular user's interest in this digital content (e.g., an advertisement), as guided by the prediction, may thus increase a likelihood that the particular user purchases a good or service from the provider as advertised by the digital content.

These conventional prediction techniques, however, could cause inaccuracies when imbalanced classes of data are used to form models to make the predictions, e.g., in which a class having a significantly larger number of members skews a prediction result. For example, these imbalanced classes may result in instances in which a positive class (e.g., data describing users that "click-through" or select digital content) has a significantly smaller probability than a negative class (e.g., data describing users that did not select digital content). Accordingly, such conventional prediction techniques could be inaccurate and inefficient in control of user interaction with digital content, thus resulting in missed conversion opportunities on the part of a provider of a good or service due to failure to provide digital content of interest to the user as well as a user that may actually desire the good or service but is not made aware due to disinterest of the user with the digital content.

SUMMARY

Digital content interaction prediction and training techniques that address imbalanced classes are described. In one or more implementations, a digital medium environment is described to predict user interaction with digital content that addresses an imbalance of numbers included in first and second classes in training data used to train a model using machine learning, e.g., a first class of users that have interacted with digital content as opposed to a second class of users that have not. The training data is received that describes the first class and the second class, such as to describe users and corresponding characteristics of the users.

A model is trained using machine learning. The training includes sampling the training data to include at least one subset of the training data from the first class and at least one subset of the training data from the second class. In this way, the sample is ensured to include training data from both classes, e.g., from users that have interacted with digital content as well as from users that have not. Iterative selections are made of a batch from the sampled training data. The iteratively selected batches are iteratively processed by a classifier implemented using machine learning to train the model. A likelihood of interaction with the digital content by the user is predicted using the trained model, the predicted likelihood used to control user interaction with the digital content.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
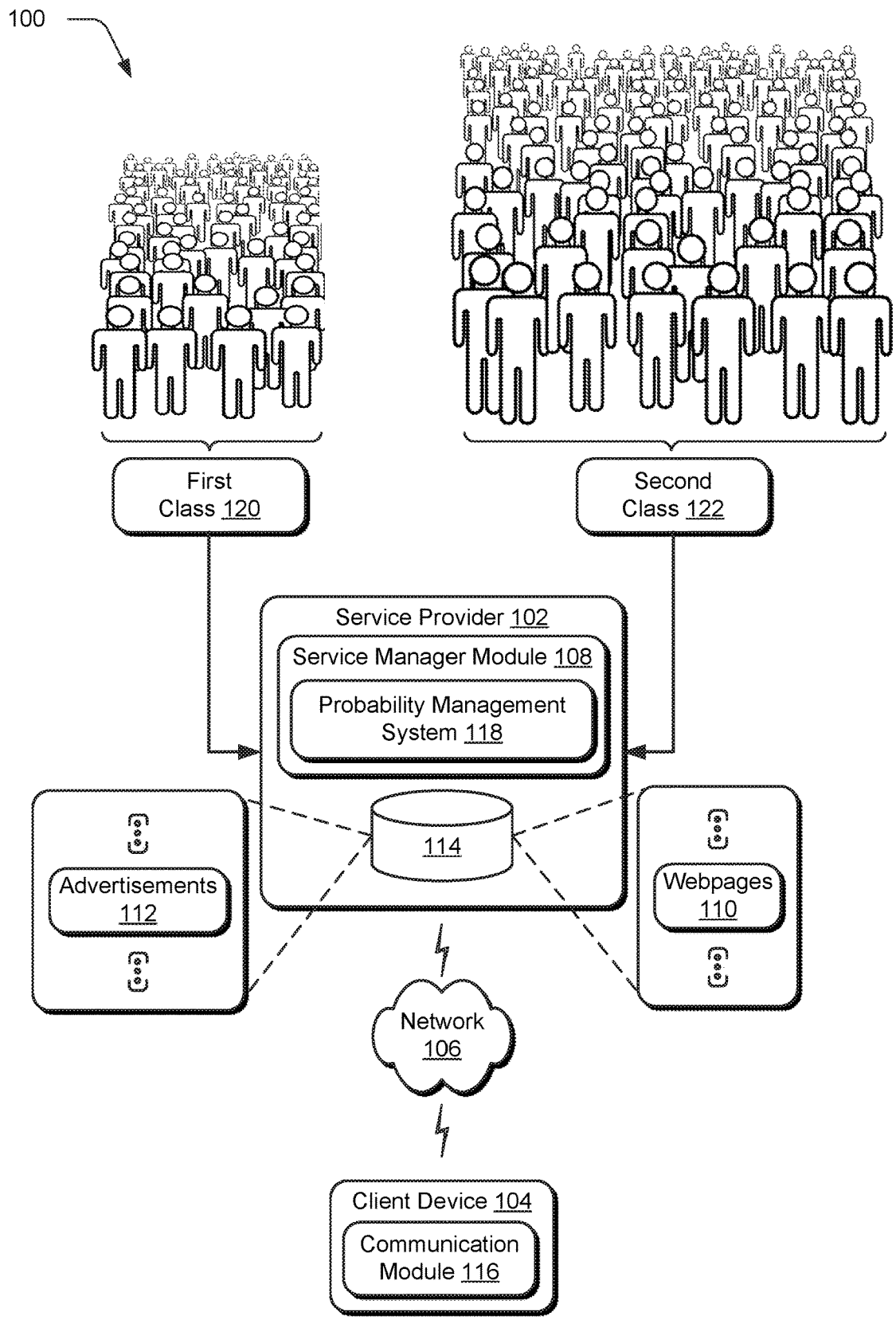
FIG. 1 is an illustration of an environment in an example implementation that is operable to employ digital content interaction and prediction techniques described herein.

Prediction of a likelihood that a user will interact with digital content in a digital medium environment is used as a basis to optimize selection and placement of advertisements within the environment, such as to increase a probability that a user will purchase a good or service. This includes a predicted likelihood that an advertisement will be selected (e.g., a "click-through" rate) or will lead to conversion, e.g., a conversion rate. A challenge in estimating these probabilities accurately, however, is that a positive class (e.g., "click," "conversion") typically has a significantly smaller probability and thus a significantly fewer number of members than the other class that does not involve this selection. This is typically referred to as an imbalanced class problem and is known to result in errors in the prediction.

Conventional techniques to address this imbalanced class problem involve subsampling the majority (e.g., negative class) examples in the training data to create a new balanced dataset. In other words, samples are taken from the class having the larger number of members. This re-balanced dataset is then used to train a classifier as a part of machine learning to learn a model that is usable to predict user interaction with digital content. If stochastic gradient descent (SGD) is used in training the classifier, as in the case where a classifier is implemented as a neural network, SGD is applied to optimize a loss function computed from the small re-balanced dataset as part of the training. However, this introduces another source of variance in the training through the subsampling of the majority class. If the minority class has a few examples, then the rebalanced dataset can also be small, and hence the estimated parameter also exhibits a high variance. Accordingly, such an approach leads to error in the training of the model using machine learning and thus inaccuracies when using the model to control user interaction with digital content.

Digital content interaction prediction and training techniques are described that address imbalanced classes. In one or more implementations, rather than sampling data and then training a model as part of a machine learning technique which can introduce high levels of variance in the sample due to imbalance of the classes, techniques are described that incorporate sampling of the training data as part of the machine learning itself. Further, this sampling is performed to ensure that training data from both classes is obtained, even if imbalanced. Training data is obtained by an iterative machine learning system (e.g., one that employs a neural network and stochastic gradient descent) and sampled such that the samples are taken from both classes and thus are balanced for training purposes. For example, the sample may describe a positive class describes positive user interactions such as selection of digital content and a negative class describes negative user interactions that do not involve selection of the digital content.

The sample is then used to form at least one batch that is used as part of an iterative process (e.g., through successive selections of the batch and training of the model using those batches) to train a classifier using machine learning to form a model that is usable to predict user interaction with digital content. For example, if a size of a batch is the same as the size of the sample then a single iteration is performed and if smaller multiple iterations are performed to select a batch and use the batch to train the model. Once this sample is exhausted, other samples may also be iteratively taken from the training data that are also formed from both classes in this example. In this way, each batch used as part of training includes data from both the positive and negative classes from samples that include data from both the positive and negative classes and thus ensures inclusion of data from both classes as part of training, thereby overcoming the imbalanced class problem above. Thus, an entirety of the training data may be used in a manner that reduces variance within the training data that is actually used to train the model and thus increase accuracy of the model in making the prediction and subsequent control of user interaction with digital content.

The techniques described above support a variety of advantages over conventional techniques. The first advantage is that variance caused by conventional techniques by sub-sampling in advance is avoided by ensuring that samples are used from both positive and negative classes within batches (i.e., the subsamples) that are used to train a model over one or more iterations. For example, the techniques described herein may iterate over different samples and batches taken from those samples to form the model, thereby allowing the model to learn a more robust representation of the underlying data than is possible using a single subsample.

Another advantage is that these techniques facilitate a relatively simple mechanism for selecting an optimum rate for forming the batches, i.e., the subsamples. For example, for a stochastic gradient descent machine learning technique a simple grid-search process may be used to set different subsampling percentages (e.g., to specify a size of a sample), machine learning is then performed to generate a mode for each setting, and the parameter combination that leads to the best result is noted. The low variance of the result makes this a better option than conventional machine learning techniques that employ multiple different subsampled datasets with a high variance in the results and thus a determination of "which size is better" may not be readily determined based on this variance. Further discussion of these and other systems and techniques is included in the following sections.

In the following discussion, an example environment is first described that may employ the digital content interaction prediction and training techniques that address imbalanced classes described herein. Example procedures are then described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital content interaction prediction and training techniques that address imbalanced classes described herein. The illustrated environment 100 includes a service provider 102 and a client device 104 that are communicatively coupled, one to another, via a network 106, which may be configured in a variety of ways.

The service provider 102 and client device 104 may be implemented by one or more computing devices. A computing device, for instance, may be configured as a desktop computer, a laptop computer, a mobile device (e.g., assuming a handheld configuration such as a tablet or mobile phone as illustrated), and so forth. Thus, a computing device may range from full resource devices with substantial memory and processor resources (e.g., personal computers, game consoles) to a low-resource device with limited memory and/or processing resources (e.g., mobile devices). Additionally, a computing device may be representative of a plurality of different devices, such as multiple servers utilized by a business to perform operations "over the cloud" as further described in relation to FIG. 6.

The service provider 102 is illustrated as including a service manager module 108 that is representative of functionality to control user interaction with digital content. Examples of digital content are illustrated as webpages 110, and advertisements 112 that are stored in storage 114 and made available to the client device 104 via the network 106, such as through a communication module 116 including a browser, network-enabled application, and so forth. The service manager module 108, for instance, may determine which webpages 110 and/or advertisements 112 to provide to the client device 104 to increase a likelihood that the user will find this digital content of interest. This interest may then result in a corresponding increase in likelihood that the user will select the digital content, result in a conversion such that the user purchases a good or service, and so on.

As part of this control, the service management module 108 includes a probability management system 118 that is representative of functionality to determine a likelihood that a user will interact with particular digital content, e.g., particular ones of the advertisements 112 when included in a webpage 110. In this way, the service manager module 108 may determine which of the plurality of items of digital content will most likely result in a conversion for a particular user and provide those items.

As previously described, however, imbalanced training data may introduce errors in training a model using machine learning that is used to make these predictions. For example, a first class 120 in this example corresponds to a "positive" class that includes members (e.g., users) that have "clicked-through" an advertisement, resulted in a conversion, and so forth. A second class 122 in this example corresponds to a "negative" class that did not result in a "click through" or conversion. Accordingly, as illustrated a number of members in the first and second classes 120, 122 is significantly imbalanced as typically a fewer number of users interact with the digital content positively than negatively.

Traditional techniques employed for handling imbalanced training data typically involve sub-sampling the majority class examples so as to create a relatively balanced dataset. The rebalanced dataset is then used to train a model as a part of machine learning that is usable to predict the likelihood of user interaction with digital content. In the case of extreme imbalanced data as in the example above, however, this subsampling procedure can produce very small training sets. Accordingly, the sub-sampling procedure itself introduces a source of high variance that then causes errors in an ability of a model trained using this data to make accurate predictions regarding user interaction with digital content.

The probability management system 118 described herein is configured to address an imbalanced training set without sub-sampling in advance in a process also referred to as stochastic sub-sampling gradient descent (SSGD) in the following. This technique works by keeping the original (and possibly imbalanced) training data, but sub-sampling a majority class inside each stochastic gradient descent (SGD) iteration used to train a model, which avoids sub-sampling the training set in advance. In this way, a model is trained that functions as an improved classifier with lower variance. In the case of a neural network (NN), since stochastic gradient descent is typically used to train the neural network, the proposed techniques result in a more robust estimation having lower variance for neural network parameters via a modification to an inner loop of stochastic gradient descent where the individual gradients collected from the major class are subsampled as further described in the following.

Figure 2:
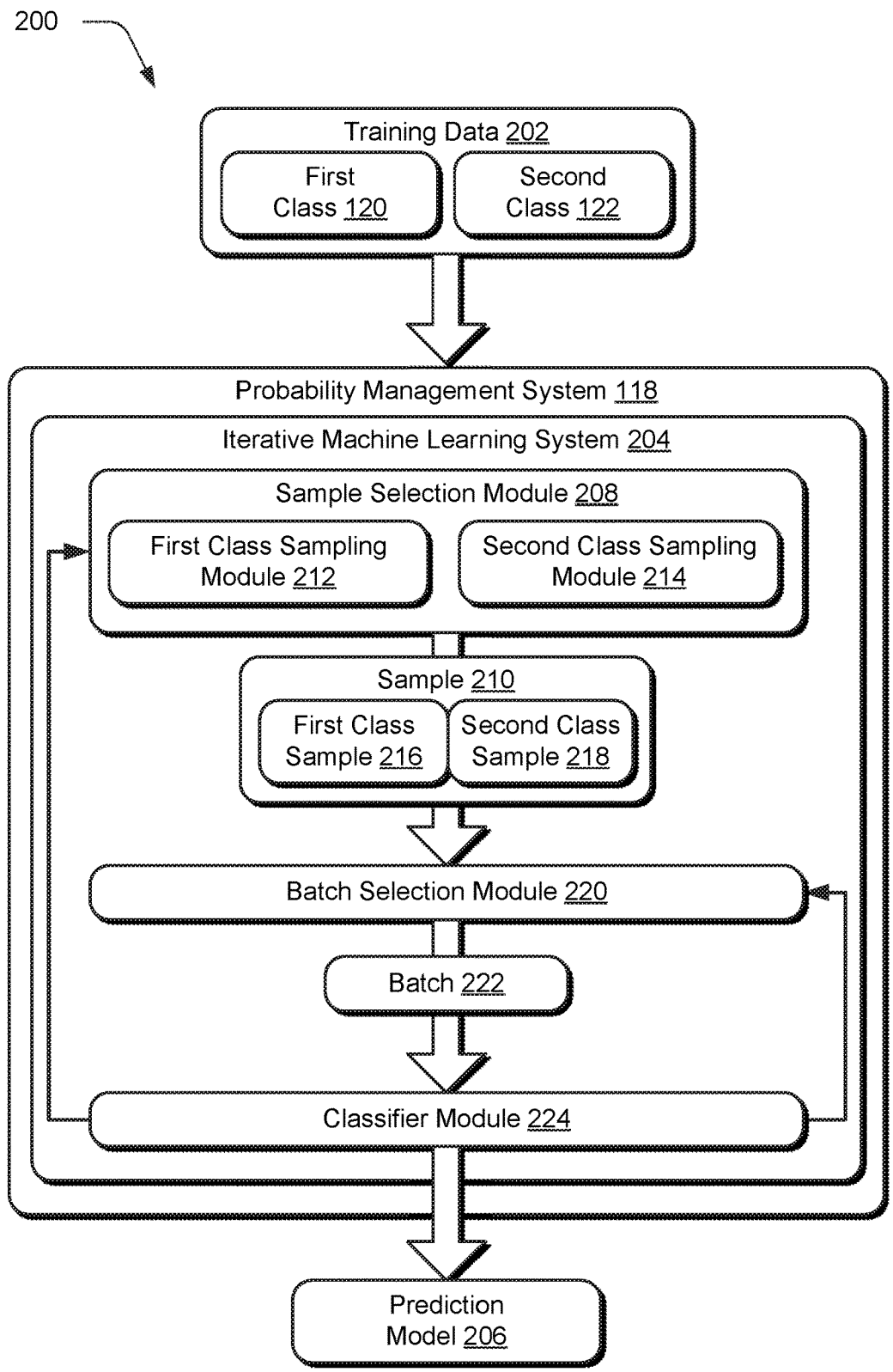
FIG. 2 depicts a system in an example implementation showing a probability management system of FIG. 1 in greater detail as training a model that is usable to predict user interaction with digital content.
Figure 3:
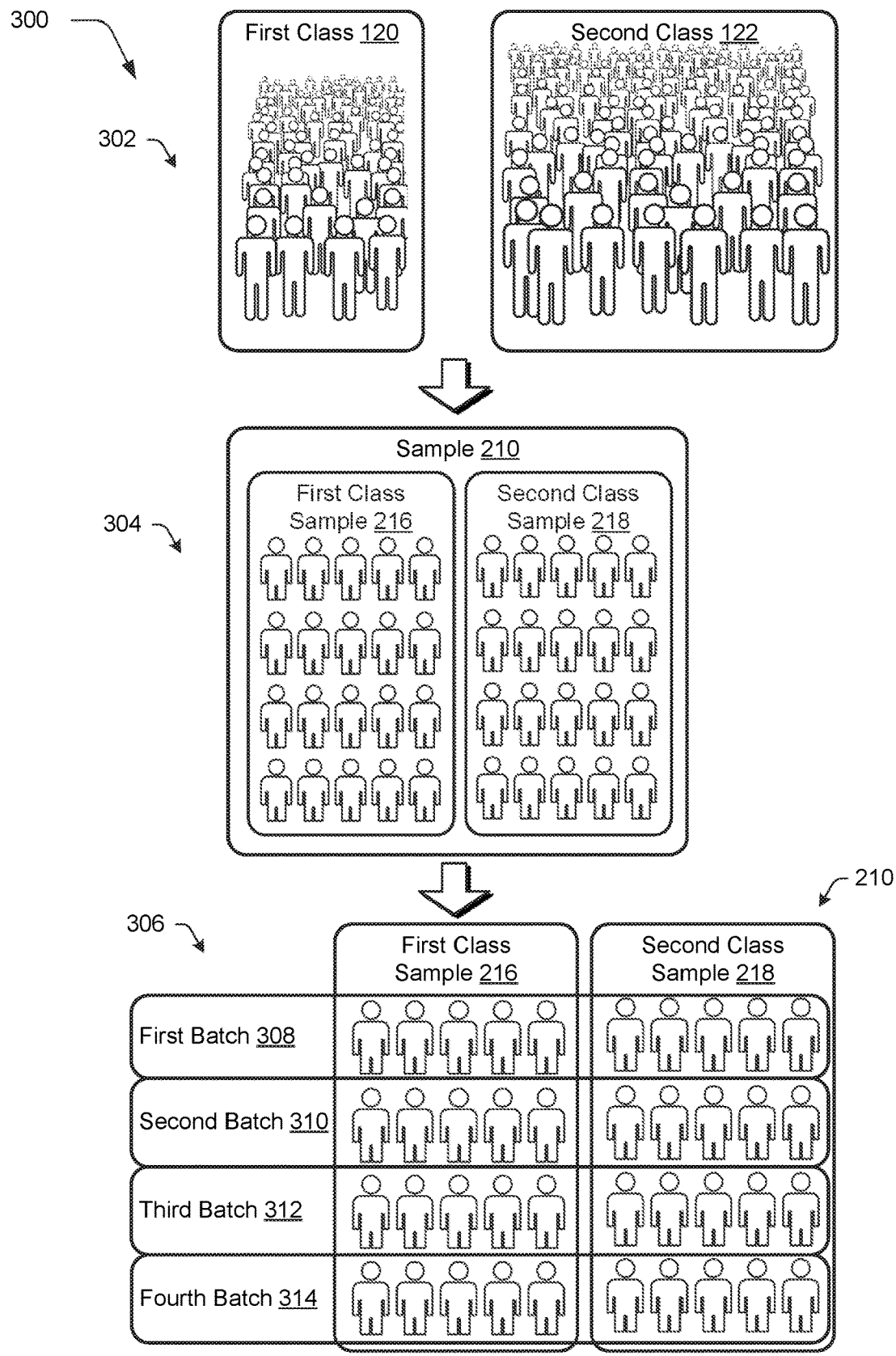
FIG. 3 depicts an example system of balanced selection of training data used to iteratively train the model, which is depicted using first, second, and third stages.

FIG. 2 depicts a system 200 in an example implementation showing the probability management system 118 of FIG. 1 in greater detail as training a model that is usable to predict user interaction with digital content. FIG. 3 depicts an example system 300 of balanced selection of training data used to iteratively train the model, which is depicted using first, second, and third stages 302, 304, 306. Accordingly, the following discussion alternates between descriptions of these figures as part of training of the model.

Figure 4:
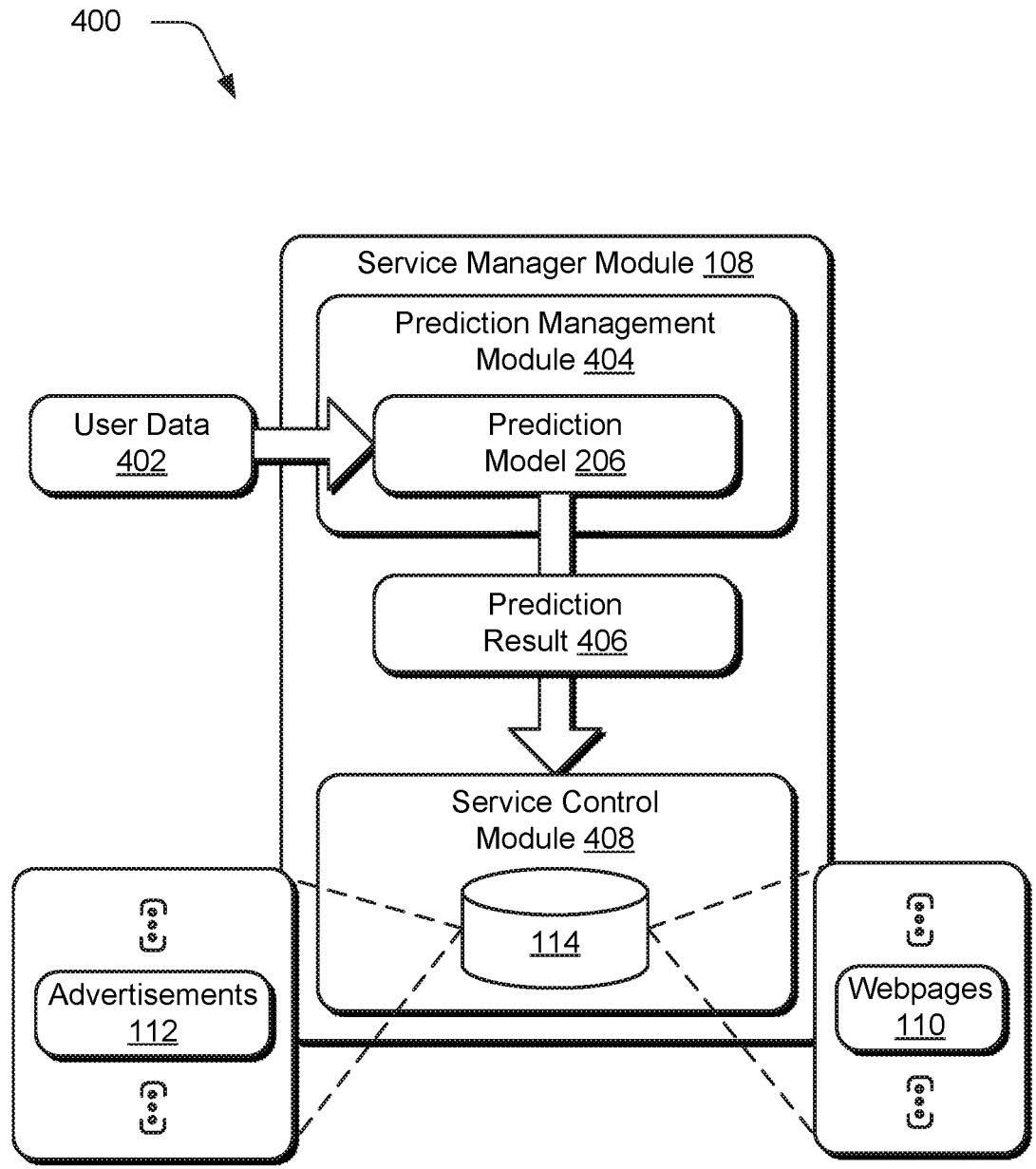
FIG. 4 depicts a system in an example implementation in which a prediction model trained in the system of FIG. 2 is used to predict user interaction with digital content and use this prediction to control the digital content.

To start, training data 202 is received by an iterative machine learning system 204 of the probability management system 118 in order to train a prediction model 206 that is usable to predict a likelihood of user interaction with digital content as further described in relation to FIG. 4. The training data 202 is obtainable from a variety of different services, such as an analytics service that monitors user interaction with digital content, individual websites, and so forth.

The training data 202 in this example describes first and second classes 120, 122 of members, such as the positive and negative classes of user as previously described. Other numbers of classes are also contemplated without departing form the spirit and scope thereof. The training data 202 may describe a variety of characteristics, such as characteristics of users that have reacted positively or negatively to digital content including advertisements 112, webpages, and so forth. The training data 202, for instance, may be correlated with respective users and describe a geographic location of a user (e.g., IP address), time of day interaction occurred, types of digital content with which the interaction occurred, other digital content leading up to and occurring after a particular digital interaction, demographic data of the user (e.g., age, nationality, gender), types of devices used to perform the interaction, software used as part of the interaction, and so forth.

In this example, the first and second classes 120, 122 are significantly imbalanced, one to another, as shown at the first stage 302 of FIG. 3. Accordingly, the iterative machine learning system 204 employs a sample selection module 208 that is representative of functionality to select a sample 210 from the training data 202 that is balanced, approximately, as shown in the first and second classes samples 216, 218. In this example, the sample selection module 208 is configured to employ first and second class sampling modules 212, 214 to generate respective first and second class samples 216, 218 although again other numbers of classes are also contemplated. Thus, the sample 210 includes data from both the first and second classes 120, 122 which is then used to train the model in a manner having reduced variance over conventional techniques.

The first and second class sampling modules 212, 214 may employ a variety of techniques to form the first and second class samples 216, 218. Continuing with the example, the first class 120 may be the "positive" class that describes positive digital content interactions and thus has a fewer number of members than a number included in the "negative" second class 122. Accordingly, the first class sampling module 212 may employ a predefined parameter that recites a number of members to be chosen from the first class 120, e.g., a minimum number of members, a number of members that is reserved as part of the sample 210 if available, and so forth. Thus, the first class sample 216 is first formed in this example from the first class 120 in the training data 202 that has a fewer number of members.

The second class sampling module 214 is then used to "fill in" the rest of the sample, such as to form a second class sample 218 that approximates a number of members in the first class sample 216. The second class sampling module 214, for instance, may randomly sample members of the second class 122 to reach a predefined parameter, which may be based on a number of members collected for the first class sample 216. In this way, the sample selection module 208 may balance data included in the sample 210 from the first and second classes 120, 122 of training data 202.

This sample 210 is then used as part of an iterative technique to train the prediction model 206. First, a batch selection module 220 is used to iteratively select batches 222 from the sample 210. An example of this is shown at the third stage 306 of FIG. 3 in which first, second, third, and fourth batches 308, 310, 312, 314 are selected from the sample 210. First batch 308, for instance, is first used by the classifier module 224 to train the prediction model 206. This is followed by the second batch 310, third batch 312, fourth batch 314, and so on until use of the data in the sample 210 is completed as shown by the arrow from the classifier module 224 to the batch selection module 220.

Once the sample 210 is "used up," the sample selection module 208 creates another sample 210 having training data from both the first and second classes 120, 122. This process may continue until an entirety of the training data 202 is used, until a sufficient level or training is reached, and so forth. In this way, the iterative machine learning system 204 leverages two iterative loops to train the prediction model 206.

FIG. 4 depicts a system 400 in an example implementation in which a prediction model 206 trained in the system 200 of FIG. 2 is used to predict user interaction with digital content and use this prediction to control the digital content. User data 402 describing a user that has subsequently accessed services provided by the service manager module 108 is obtained (e.g., is not included in the training data), such as to identify which webpages a user has interacted with, type of browser used, computing device used, geographic location, and so forth. This user data 402 is then employed by a prediction management module 404 using the prediction model 206 trained as described in relation to FIGS. 2 and 3 to obtain a prediction result 406.

The prediction result 406 is then used by a service control module 408 to control which advertisements 112 are included as part of webpages 110 and even what webpages 110 are made available based on the prediction result 406. The prediction result 406, for instance, may indicate that particular advertisements 112 have an increased likelihood in comparison with other advertisements in resulting in a selection or conversion. Based on this, the service control module 408 controls exposure of this digital content to a user corresponding to the user data 402 and thus may efficiently and accurately support user interaction with the service provider 102. A variety of other examples are also contemplated.

Stochastic Gradient Descent

A variety of machine learning techniques may be employed by the iterative machine learning system 204, an example of which includes a stochastic gradient descent (SGD) technique. At a high level, conventional stochastic gradient descent (SGD) works by randomly selecting a "batch" (i.e. subset) of data to work with in any given iteration, and performs optimization of the model parameters using that subset of data. The size of this subset is usually called the "batch-size". For example, in a neural network, SGD is used to select a random batch of data from the input, and sends it through the neural network to the top, using the intermediate layers to transform the data into a form that is then used to calculate the stochastic gradient of an error function with respect to a ground truth, e.g., which may be provided in the form of class labels for the input.

Stochastic gradient is then used to update parameters of each of the layers in the model in such a way that the error is minimized. In the following iterations, this technique randomly selects other subsets and repeats the process. SGD-based techniques have been found to be particularly useful in online contexts where the model addresses incoming data on the fly.

As such, the performance of such a technique depends to a large extent on the actual batch being used, i.e., the training data in the batch. For imbalanced data this can create a problem because certain batches may not contain any data from the minority class, thereby contributing noise. As previously described, conventional techniques dealt with imbalanced classes by subsampling the training data beforehand to create a representation having increased balance, and then to processing this training data using stochastic gradient descent. However, selection of the optimal subsampling rate may be complicated in these situations, and is not considered a principled way to approach the problem since the model trained with a subsampled dataset will not, with a high degree of probability, learn the underlying structure of the data from the full dataset.

To address this issue, the iterative machine learning system 204 incorporates the subsampling process inside each stochastic gradient descent iteration, which is referred to as stochastic subsampling gradient descent (SSGD) technique in the following.

The stochastic subsampling gradient descent technique has a two-phase approach to selecting a batch 222 to send through to the classifier module 224. In the first phase, a random subset of the majority class (e.g., the second class) is sampled by the second class sampling module 214 and combined with (e.g., a portion, all, or even upsampled) first class sample 216 from the first class sampling module 212 data from the minority class, e.g., the first class. The sample selection module 208 then shuffle the training data from the first and second class samples 216, 218 to create a subset of the data denoted as SGD sub-dataset in the following discussion and represented by sample 210 in FIG. 2. The subsampling and upsampling percentages can be specified as parameters.

In the second phase, the iterative machine learning system 204 starts by selecting the first mini-batch of this SGD sub-dataset using the batch selection module 220. The batch-size for the mini-batch can be specified as a predefined parameter. In successive iterations of the second phase as shown by the arrow between the batch selection and classifier modules 220, 224, assuming the batch-size is less than the size of the subsampled data, the batch selection module 220 successively selects batches from the sample 210 (i.e., the SGD sub-dataset) to send to the classifier module 224.

Once an end of the sample 210 (i.e., the SGD sub-dataset) is reached, the iterative machine learning system 204 reverts to the first phase and draws another sample from the full set of training data 202, again using the specified subsampling and possibly upsampling parameters. If the batch-size of the batch 222 is set to the same size as the sample 210, then there is a single iteration in the second phase in which each of the data points in the current SGD sub-dataset (i.e., sample 210) is used in computation of the stochastic gradient.

In this way, the techniques described herein support a variety of advantages. The first advantage is that the variance in the estimated parameter arising from significantly different subsamples if sub-sampling is performed in advance is avoided. The stochastic subsampling mechanism iterates over different input subsamples for the same model, thereby allowing the model to learn a more robust representation of the underlying data than is possible using a single subsample.

The second advantage is that this process facilitates a relatively simple technique for selecting an optimum subsampling rate, e.g., a simple grid-search procedure to do so may involve setting different subsampling percentages in the input parameters and running the SSGD-based classifier for each of the SSGD subsampled setting, and noting the parameter combination that leads to the best result. The low variance of the result makes this a better option than running SGD-based classifiers on multiple different subsampled datasets with a high variance in the results. Further, these techniques practically reduce the cost of sub-sampling parameter selection by a constant multiple of "N," where "N" is the number of subsamples drawn for a given subsampling percentage to achieve a stable estimate of the performance of the classifier.

This principled approach to deal with imbalanced data in the SGD context can have widespread applications, in all classification workflows where SGD is used, for many different kinds of classifiers, and not necessarily restricted to neural networks. In an example implementation, this technique was performed fifty times using a subsampling percentage of nine percent and upsampling percentage of two and a half for a multitask neural network, and its performance compared to the numbers reported by one hundred different instances of a multitask network with the same architecture and parameter values running on one hundred different pre-subsampled datasets using standard SGD, in both cases running the SGD for 25,000 iterations. It was observed that the network running the SSGD technique described herein has a small variance (10-fold better variance than the alternative) as well as obtains significantly better performance.

Example Procedures

The following discussion describes digital content interaction prediction and training techniques that address imbalanced classes and that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
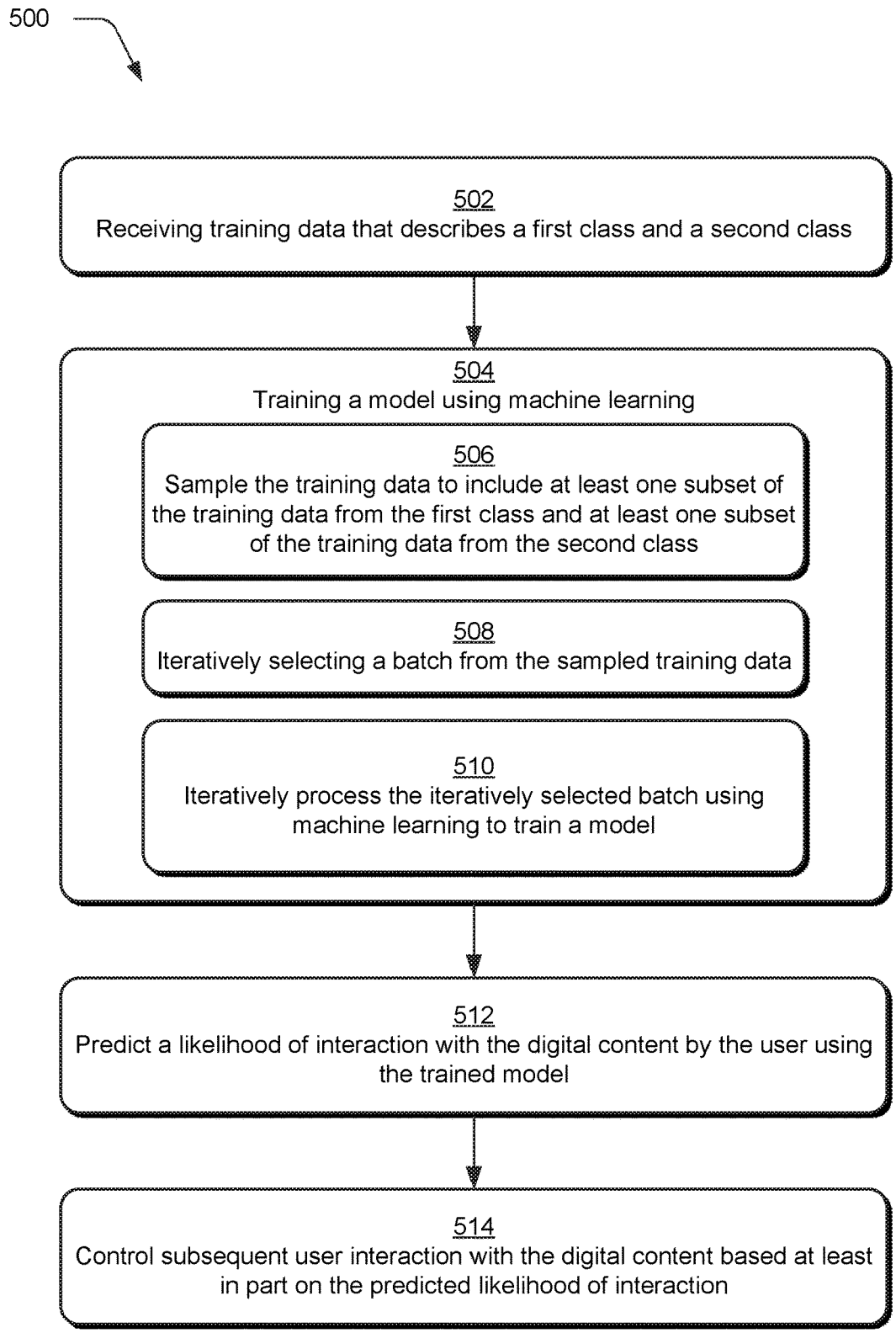
FIG. 5 is a flow diagram depicting a procedure in an example implementation in which a model is trained and used to predict user interaction with digital content.

FIG. 5 depicts a procedure 500 in an example implementation in which a model is trained and used to predict user interaction with digital content. A digital medium environment is described to predict user interaction with digital content that addresses an imbalance of numbers included in first and second classes in training data used to train a model using machine learning. The training data 202 is received that describes the first class 120 and the second class 122 (block 502), such to describe positive and negative classes of user interaction with a web service of the service provider 102.

A model is trained using machine learning (block 504), such as through stochastic gradient descent. The training includes sampling the training data to include at least one subset of the training data from the first class and at least one subset of the training data from the second class (block 506) and thus insures that a sample 210 includes data from the first and second classes 120, 122.

Iterative selections are made of a batch 222 from the sampled training data (block 508) by a batch selection module 220. The iteratively selected batches are iteratively processed using machine learning to train the model (block 510), such as through use of a neural network.

A likelihood of interaction with the digital content by the user is predicted using the trained model, the predicted likelihood used to control user interaction with the digital content (block 512). The model, for instance, may determine probabilities of which items of digital content are likely to be of interest to a user. Subsequent user interaction with the digital content is then controlled based at least in part of the predicted likelihood of interaction (block 514), such as to control which webpages 110, advertisements 112, and so on are exposed to the user. A variety of other examples are also contemplated.

Example System and Device

Figure 6:
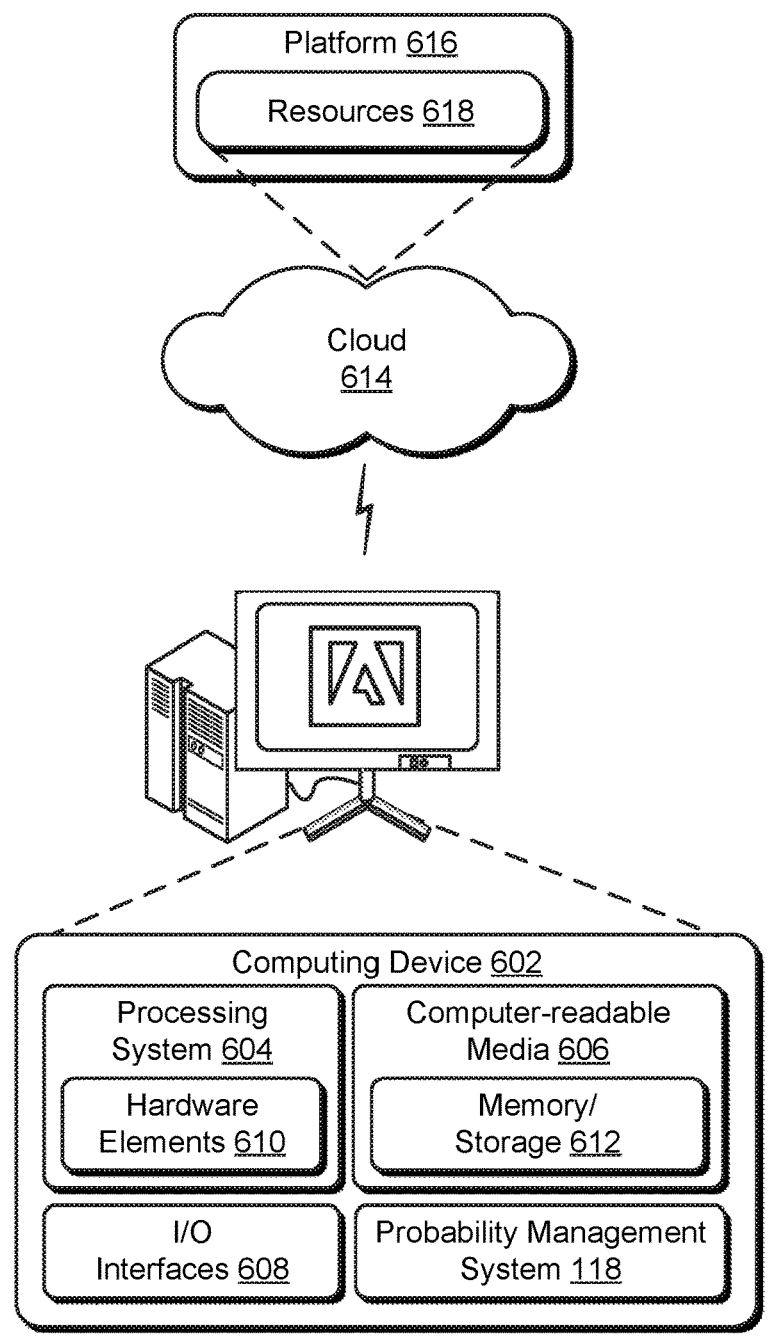
FIG. 6 illustrates an example system including various components of an example device that can be implemented as any type of computing device as described and/or utilize with reference to FIGS. 1-5 to implement embodiments of the techniques described herein.

FIG. 6 illustrates an example system generally at 600 that includes an example computing device 602 that is representative of one or more computing systems and/or devices that may implement the various techniques described herein. This is illustrated through inclusion of the probability management system 118. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interface 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware element 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 606 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 602, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 610 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 602 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to predict user interaction with subsequent digital content, a method implemented by at least one computing device comprising:

receiving training data, by the at least one computing device, that describes a first class of users having interactions with digital content and a second class of users that did not interact with the digital content;

obtaining, by the at least one computing device, a subset parameter and a batch parameter, the subset parameter is set using machine learning to indicate a total number of samples from a first class sample subset and a second class sample subset to be included in a subset of the training data and the batch parameter set using machine learning to indicate a number of samples to be included in a batch taken from the subset of the training data;

training a model using machine learning by the at least one computing device, the training including:
  generating the subset of the training data by:
    generating the first class sample subset having a number of samples taken from the first class; and
    generating the second class sample subset having a number of samples sampled from the second class that is added to the number of samples in the first class sample subset to have the number of samples specified by the subset parameter;
  selecting a batch from the subset of the training data having the number of samples specified by the batch parameter; and
  processing the selected batch using machine learning by the at least one computing device to train the model; and
predicting a likelihood of interaction with the subsequent digital content using the trained model by the computing device.

2. The method as described in claim 1, wherein the machine learning is performed by the at least one computing device using a neural network.

3. The method as described in claim 1, wherein the batch is iteratively selected and iteratively processed using stochastic gradient descent (SGD).

4. The method as described in claim 1, wherein the training data is sampled iteratively by the at least one computing device as part of the training.

5. The method as described in claim 1, wherein:
the first class is a positive class that describes the user interactions with the digital content that involve selection of the digital content or conversion of a related good or service;
the second class is a negative class that describes users that did not select the digital content or convert the related good or service; and
the first class has a fewer number of members than the second class.

6. The method as described in claim 1, wherein the training data is sampled based on a parameter that sets a sample size for the first or second classes.

7. The method as described in claim 1, wherein the predicted likelihood of interaction includes a probability that the subsequent digital content configured as an advertisement will be selected by the user or a probability of a likelihood of conversion of a related good or service by the user.

8. The method as described in claim 1, further comprising controlling exposure of the subsequent digital content, by the at least one computing device, based at least in part on the predicted likelihood of interaction.

9. The method as described in claim 1, wherein the subset parameter and the batch parameter are set using machine learning through use of a grid-search procedure to set an optimum combination of the subset parameter and the batch parameter that leads to a best result in the training of the model to predict the likelihood.

10. In a digital medium environment to generate a model to predict user interaction with subsequent digital content, an iterative machine learning system comprising:
a sample selection module implemented by a processing system and computer readable storage medium to:
  obtain a subset parameter specified using machine learning to indicate a total number of samples from a first class sample subset and a second class sample subset to be included in a subset of training data; and
  generate the subset of the training data including the first class sample subset taken from a first class of the training data and the second class sample subset having a number of samples sampled from a second class of the training data such that the subset of the training data reaches the number of samples specified by the subset parameter;
a batch selection module implemented by the processing system and computer readable storage medium to:
  obtain a batch parameter set using machine learning to indicate a number of samples to be included in a batch taken from the subset of the training data; and
  iteratively select a batch from the subset of the training data having the number of samples indicated by the batch parameter; and
a classifier module implemented by the processing system and computer readable storage medium to process the iteratively selected batch using machine learning to train the model to predict a likelihood of interaction with the subsequent digital content by the user.

11. The system as described in claim 10, wherein the batch selection module uses stochastic gradient descent (SGD) to iteratively select the batch.

12. The system as described in claim 10, wherein the sample selection module is implemented by the processing system and computer readable storage medium to iteratively sample the subset of the training data from the first class and the subset of the training data from the second class that is used by the batch selection module to iteratively select the batch.

13. The system as described in claim 10, wherein:
the first class is a positive class that describes the user interactions with the digital content that involve selection of the digital content or conversion of a related good or service;
the second class is a negative class that describes users that did not select the digital content or convert the related good or service; and
the first class has a fewer number of members than the second class.

14. The system as described in claim 10, wherein the sample selection module samples the training data based on a parameter that sets a sample size.

15. The system as described in claim 10, further comprising a prediction management module implemented by the processing system and computer readable storage medium to predict a likelihood of interaction with the subsequent digital content by the user using the trained model.

16. The system as described in claim 15, wherein the predicted likelihood of interaction includes a probability that the subsequent digital content formed as an advertisement will be selected by the user or a probability of a likelihood of conversion of a related good or service by the user.

17. The system as described in claim 15, further comprising a service control module implemented by the processing system and computer readable storage medium to control exposure of the subsequent digital content based at least in part on the predicted likelihood of interaction.

18. In a digital medium environment to predict user interaction with subsequent digital content, a method implemented by at least one computing device comprising:
receiving training data, by the at least one computing device, that describes a first class of users having interactions with digital content and a second class of users that did not interact with the digital content;
training a model using machine learning by the at least one computing device, the training including generating a training sample by:
obtaining a subset parameter set using machine learning, the subset parameter indicating a total number of samples from a first class sample subset and a second class sample subset to be included in a subset of the training data;
generating the first class sample subset from the first class;
upsampling the first class sample subset to have a number of samples based on an upsampling parameter;
generating the subset of the training data as having the upsampled first class sample subset and the second class sample subset having a number of samples sampled from the second class such that the subset of the training data reaches the subset parameter;
obtaining a batch parameter, the batch parameter set using machine learning to indicate a number of samples to be included in a batch taken from the subset of the training data;
selecting a batch from the subset of the training data based on the batch parameter; and
processing the selected batch using machine learning by the at least one computing device to train the model; and
predicting a likelihood of interaction with the subsequent digital content by using the trained model by the computing device.

19. The method as described in claim 18, wherein the subset parameter and the batch parameter are set using machine learning through use of a grid-search procedure.

20. The method as described in claim 18, wherein the subset parameter and the batch parameter are set using machine learning as part of a technique to set an optimum combination of the subset parameter and the batch parameter that leads to a best result in the training of the model to predict the likelihood.

* * * * *